United States Patent [19]

Wicks

[11] Patent Number: 5,595,945

[45] Date of Patent: Jan. 21, 1997

[54] CERAMIC COMPOSITE COATING

[75] Inventor: George G. Wicks, Aiken, S.C.

[73] Assignee: The United States of America as represented by the Department of Energy, Washington, D.C.

[21] Appl. No.: 796,974

[22] Filed: Nov. 25, 1991

Related U.S. Application Data

[62] Division of Ser. No. 668,364, Mar. 14, 1991, abandoned, which is a continuation of Ser. No. 293,846, Jan. 5, 1989, abandoned.

[51] Int. Cl.$^6$ ................................................. C04C 35/14
[52] U.S. Cl. ............................................. 501/12; 501/154
[58] Field of Search ............................... 501/12, 154

[56] References Cited

U.S. PATENT DOCUMENTS

| | | | |
|---|---|---|---|
| 4,278,632 | 7/1981 | Yoldas | 501/12 |
| 4,397,666 | 8/1983 | Mishima et al. | 501/12 |
| 4,788,046 | 11/1988 | Barringer et al. | 501/12 |
| 4,806,328 | 2/1989 | Van Lierop et al. | 501/12 |

*Primary Examiner*—David Brunsman
*Attorney, Agent, or Firm*—Harold M. Dixon; William R. Moser; Paul A. Gottlieb

[57] ABSTRACT

A thin, room-temperature-curing, ceramic composite for coating and patching metal substrates comprises a sol gel silica glass matrix filled with finely ground particles or fibers, preferably alumina. The sol gel glass is made by adding ethanol to water to form a first mixture, then separately adding ethanol to tetraethyl orthosilicate to form a second mixture, then slowly adding the first to the second mixture to make a third mixture, and making a slurry by adding the finely ground particles or fibers to the third mixture. The composite can be applied by spraying, brushing or trowelling. If applied to patch fine cracks, densification of the ceramic composite may be obtained to enhance sealing by applying heat during curing.

12 Claims, No Drawings

CERAMIC COMPOSITE COATING

BACKGROUND OF THE INVENTION

FIELD OF THE INVENTION AND CONTRACT STATEMENT

The present invention relates to opaque ceramic composites for coating patching, sealing or otherwise, repairing substrates. The United States Government has rights in this invention pursuant to Contract No. DE-AC09-76SR00001 between the Department of Energy and E. I. DuPont De Nemours & Co.

This application is a divisional of application Ser. No. 668,364, filed Mar. 14, 1991, now abandoned, which is itself a continuation of application Ser. No. 293,846; filed Jan. 5, 1989, now abandoned.

DISCUSSION OF BACKGROUND AND PRIOR ART

Substrates such as the surfaces of piping, vessels of metal, glass, ceramics, and the like used in industrial processes, especially in processing hazardous and radioactive materials, or in construction or used as consumer products, are prone to develop cracks or become cracked from a variety of causes. Intergranular stress corrosion cracking and helium embrittlement are two such causes of cracking in metal substrates; welding operations and metal fatigue are two others. Furthermore, cracks in metal or other piping materials or vessel walls used for transporting or containing liquids and gasses can leak, especially if the liquid or gas within the pipe or vessel is under pressure. Glass windshields develop cracks from stones thrown by tires of other vehicles; and shifting foundations will produce cracks in masonry such as cinderblocks.

Being able to apply a small amount of a material to fill, coat or both fill and coat substrates for protection against cracking, to patch, or repair it by welding cracks that have developed, rather than replace the substrate is more economical, and, sometimes, more importantly, allows vital operations to continue until the next scheduled shutdown. It is important that such a coating or patching material stop leaks. It is also important that the coating or patching material be resistant to ionizing radiation, reasonably inert to chemical attack and generally fire retardant. Ease of application is another desirable feature of a coating and patching composite especially in an environment that is harmful to the health and safety of workers where the repairing must be done simply, quickly and/or by remote means.

Glass has long been known to accept fillers for a variety of purposes. However, use of sol gel glass with fillers as a fill, coating or patching, etc. for cracks in a substrate to stop or prevent leaks has heretofore not been known.

BRIEF SUMMARY OF THE INVENTION

It is an object of the present invention to provide a opaque ceramic composite for coating and patching or otherwise repairing metal substrates.

It is another object of the present invention to provide a ceramic composite for stopping leaks from cracks in metal piping and vessels, particularly metal pipes and vessels carrying pressurized gas or liquid.

It is still another object of the present invention to provide a method for easily and quickly stopping leaks from cracks in substrates.

It is a further object of the present invention to provide a ceramic composite for applying to and repairing substrates that is radiation resistant, fire retardant and/or relatively inert to chemical attack.

To achieve the foregoing and other objects and in accordance with the purposes of the invention, as embodied and broadly described herein, the ceramic composite comprises a curable, sol gel glass matrix containing crystalline powders, or fibers for repairing, particularly in a fluid tight manner, cracks in substrates. In a preferred embodiment, the sol gel glass is a silica glass and the crystalline powder is fine alumina particles. The composite is applied to the substrate and cured either at room temperature or, in some applications, at elevated temperatures. Higher temperature cures have advantages in certain applications, for example, if densification of the composite is desired. If additional structural strength is desired to reinforce the composite in patching a defect, one or more, layers of a material such as cement grout or epoxy, fiber glass reinforced tape, etc. can be applied over the composite.

The composite of the present invention is easily applied, for example, by spraying, by painting with a brush or by troweling, etc. It can be applied as a preventative coating or as a repairing fill or patch to a variety of metal, glass or ceramic substrate materials having various geometries and introduces no undesirable elements to the industrial processing environment. The ceramic composite appears to bond to, and in any event, forms a chemical barrier adhering to the substrate and curing can be obtained at room temperature or higher.

Reference is now made in detail to preferred embodiments of the invention.

DETAILED DESCRIPTION OF THE PREFERRED EMBODIMENT

The opaque ceramic composite of the present invention comprises a low temperature sol gel matrix containing crystalline particles and/or fibers applied to a metal substrate to coat or otherwise repair cracks in order to avoid fluid leakage. The present composition chemically adheres to the substrate and can fill or block cracks of sizes ranging from very small stress corrosion cracks to much larger cracks and holes or other voids. There is no limit to the size of defect, however, other structural materials will in some cases be found desireable such as fiber glass fabric. The typically thin coating is radiation resistant, relatively inert to chemical attack and fire retardant. The composite may be applied to metal conduits or vessel walls, or to similar glass or ceramic articles which have defects. If mechanical support is needed to supplement the seal provided by the composite, the so repaired substrate can be covered with one or more supporting layer such as cement grout or epoxy, and the like, to form a multibarrier composite tailored to meet specific requirements.

Other fillers such as zirconium, silicon, cesium and lead can be added alone or in combination to silicate glass, however alumina particles are preferred because they are inexpensive, widely available, and are compatible with other industrial materials and usually form a stronger bond.

To prepare the composite, ethanol and water are thoroughly mixed to form a first mixture, or a pre-mix. The ratio of ethanol to water in said first pre-mix can vary widely but is preferably about two to five parts ethanol to one of water.

The alcohol is mixed with the water to facilitate the subsequent mixing of the tetraethyl orthosilicate described herein. The alcohol may serve other functions, and particularly the evaporation rate and cure time of the final composite. I have found ethanol overall to be the generally preferred alcohol. However, other low molecular weight alcohols can be used alone or in combination. Combinations may be used to obtain substantially the same evaporation and curing times; or, where desired, different curing times by slowing evaporation rates and prolonged dilutions of the silica moieties. Examples of other such low molecular weight alcohols are methanol, 2- propanol, butanol and isbutanol.

The alcohol water pre-mix is to have the pH adjusted on the acid side (pH<7), preferably into the range of about 0.5 to 5, and still more preferably about 1 to 2.5. Although organic acids such as the low molecular weight organic acids such as formic, acetic and proprionic acids, etc. can be used, the mineral acids such as HCl, $H_2SO_4$, $H_3PO_4$ and $H_2NO_3$ can also be used for pH adjustment. In the case of formic acid, it has a tendency to attack glass so that it is less preferred and may not be suitable or the acid of choice in some cases. HCl is generally preferred.

The mixture of alcohol, water, acid and tetraethyl orthosilicate can be mixed together in the same container without forming first and second pre-mixes, however, I find the pre-mix approach to be preferred for several reasons.

A second pre-mix or mixture is prepared by mixing alcohol and tetraethyl orthosilicate. The ratios of the two can vary over a wide range but they are preferably used in a ratio of approximately one part to two parts, respectively. The alcohol is used as a solvent to facilitate the thorough mixing of tetraethyl orthosilicate with water. After thoroughly mixing the alcohol and said orthosilicate, it is ready for use in the next step.

The first pre-mix and the second pre-mix are thoroughly mixed to form a third mixture. This third mixture should be aged for several hours. The effectiveness and particularly the strength correllates with ageing times. Although, as little as a few minutes aging can be sufficient, the desired aging time is at least about 2 hours, preferably is at least about 12 hours and works best when aging is at least 24 hours at room temperature. Aging allows for the desired gelation of the sol gel matrix. It is important that the aging should be in the absence of air and so as to maintain substantially the original dilution to avoid premature curing.

Finely ground crystalline material is added to the third mixture. The particulate is preferably alumina, but other crystalline material such as zirconium, cesium, lead and silicon can also be used. The particulate additive can be in the size range of submicron (e.g. 0.01 microns) up to 5 microns or even larger, of 100 to 200 microns in size. The submicron sizes are preferred for use in repairing finer cracks. However, even some amount of the submicron and slightly larger particles are desired even in repairing large cracks or voids. A wider range or distribution of sizes as distinct from a uniform size, are preferred for larger cracks and holes. The fine particulates are added to the third mixture to form a slurry-like composition. The composite may be applied with a brush, by spraying or with a trowel, depending on the consistency or viscosity and/or size of the defect to be repaired. For large cracks and voids, a thicker consistency or viscosity applies more easily and works best; for smaller cracks and when used as a coating, a thinner viscosity, made by decreasing the proportion of particles in the final un-aged composition, is preferred. Approximately six grams of particles in 15 milliliters of the third mixture is suitable composition to be applied to a small crack. A mixture of 12 grams of particles to 15 milliliters of the third mixture of sol gel and solvent (or carrier) has been used satisfactorily. Generally speaking the viscosity can vary from that for a sprayable liquid (or slurry) to a thick but spreadable paste.

Some routine experimentation may be required to determine the more appropriate viscosity or solids-loading of the mixture to determine the best manner of application and the overall effectiveness in a particular application.

The ceramic composite will cure at room temperature and at elevated temperatures. When cured at higher temperatures, the composite will densify to a higher degree. If the cracks are fine, densification improves the seal. Densification of the composite is achieved by the application of heat, such as from a heat gun, or where practical in an oven, etc. to raise the temperature of the composite to not more than about 550 degrees Celsius, preferably not more than about 450 degrees. When cured, a white, wipeable film will form on the surface of the composite. Cracks will appear to have a white filling through the otherwise slightly opaque composite.

For large cracks, heating to cure at elevated temperatures can be used but is not preferred because densification adds to the stresses within the composite spanning or filling the crack.

The ceramic composite coating or fill adheres to the substrate, assuring a good seal. The adherence of the composite to a substrate has been verified by examination of micrographs produced by scanning electron microscopy which show a bond crosses the metal oxide film, aluminum and silicon migrating to the metal portion of the interface and iron, nickel and chromium from the metal moving to the ceramic composite portion.

Samples of stainless steel (304L SS) were coated with the ceramic composite for conducting leachate testing by subjecting the samples to deionized water at 90 degrees Celsius for time periods up to 212 hours. The leachates were analyzed by inductively coupled plasma spectroscopy. Although the silicon component of the coating leached at a moderate rate, the aluminum particulates therein showed no significant leaching, even with thin coatings.

In other testing the ceramic composite coating shows itself to be hard and resistant to thermal shock. Most importantly for nuclear applications, coated substrates remained intact and leach resistant after irradiating with a cobalt 60 source at a rate of $2.5 \times 10^6$ rads/hour to a total accumulated dose of $3 \times 10^8$ rads.

The following illustrative examples further illustrate the present invention.

EXAMPLE 1

Four 0.0153 inch diameter holes were drilled in a mock up of a nuclear reactor vessel. The ceramic composite, made as described above, was applied to the outside of the mock up with a small paint brush and cured with a heat gun. Water was placed inside the vessel and agitated with a magnetic stirrer as the vessel and its contents were heated to 90 degrees Celsius. No evidence of leakage was found after one year of testing.

EXAMPLE 2

Stress corrosion cracks were made in a 304L SS bolted plate by immersing it in a special chloride solution. The leak rate of helium through the stress corrosion cracks in the plate was measured at $3\times10^{-3}$ atmospheres-cubic centimeter/second. Then the ceramic composite, made as described above was applied with a brush and cured with a heat gun. After the coating the helium leak rate improved one million fold to $2\times10^{-9}$ atmospheres-cubic centimeter/second.

EXAMPLE 3

A three-inch diameter pipe was drilled with thirty holes. The composite, mixed as described above, was applied to the holes on the outside of the pipe and cured, thus providing a chemical barrier. A cement based material was added over the sol-gel coating to improve mechanical stability. A 15% nitric acid solution at a pressure of more than 30 psig was allowed to flow through the pipe for over 1100 hours. No evidence of leakage through the holes was detected.

EXAMPLE 4

A 304L stainless steel bell was fitted with a tube and welded to a steel plate. The weld was intentionally done defectively so as to create cracks or leaks. The combined unit was placed in a water bath, pressurized, and examined to locate air leaks. After withdrawing the unit from the bath, the sol-gel composite was brushed into the leaking cracks and allowed to air dry. The unit was returned to the bath and repressurized. The coated crack began to leak when the pressure reached 20 psi, but stopped by itself and remained stopped as pressure was further increased.

EXAMPLE 5

The sol-gel composite was applied to cracks in glass laboratory beakers and the beakers filled with a colored solution and the beakers placed on paper towels. No discoloration of the paper towels occurred.

EXAMPLE 6

A plastic syringe opening was filled with the sol-gel composite. Under no pressure, the leak through the opening stopped. Under increases in pressure, the leak continued but at a reduced rate. At steady pressure, the leak decreased in time.

The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments with various modifications as are suited to the particular use contemplated. It is intended that the scope of the invention be defined by the claims appended hereto.

What is claimed is:

1. An opaque ceramic composite suitable for curing, bonding to and thereby repairing substrates, said ceramic composite being obtained by:

mixing ethanol and water to form a first pre-mix;

adjusting the pH of said first pre-mix into the acid range;

mixing ethanol and tetraethyl orthosilicate to form a second pre-mix;

adding said first pre-mix to said second pre-mix to form a third mixture and thoroughly mixing same;

aging said third mixture at room temperature; while maintaining sufficient alcohol-water solvent present from said pre-mixes to avoid premature curing of said third mixture;

mixing a fine crystalline particulate with said third mixture to form a slurry.

2. The composite of claim 1 wherein said crystalline particulate material is selected from a group consisting of alumina, silicon, lead, cesium and zirconium.

3. The composite of claim 1 wherein the size of said crystalline particulate material is in the range of less than submicron to about 200 microns.

4. The composite of claim 3 wherein said range of sizes is approximately 0.01 microns to 5 microns.

5. The composite of claim 1 wherein said first pre-mix contains about two to five parts ethanol to one part water.

6. The composite of claim 1 wherein said crystalline particulate material is alumina.

7. The composite of claim 1 wherein said crystalline particulate size distribution is in the range of about 0.01 to 50 microns.

8. The composite of claim 1 wherein said second pre-mix is in the ratio of approximately one part ethanol to two parts tetraethyl orthosilicate.

9. The composite of claim 1 wherein said aging of said third mixture is in the range of a few minutes to approximately 24 hours.

10. The composite of claim 1 wherein said aging of said third mixture is at least 12 hours.

11. The composite of claim 1 wherein said slurry contains approximately six to 12 grams, of said fine particulate to about fifteen milliliters, of said third mixture.

12. The composite of claim 1 wherein said aging of said third mixture is at least 24 hours.

* * * * *